Figure 1:
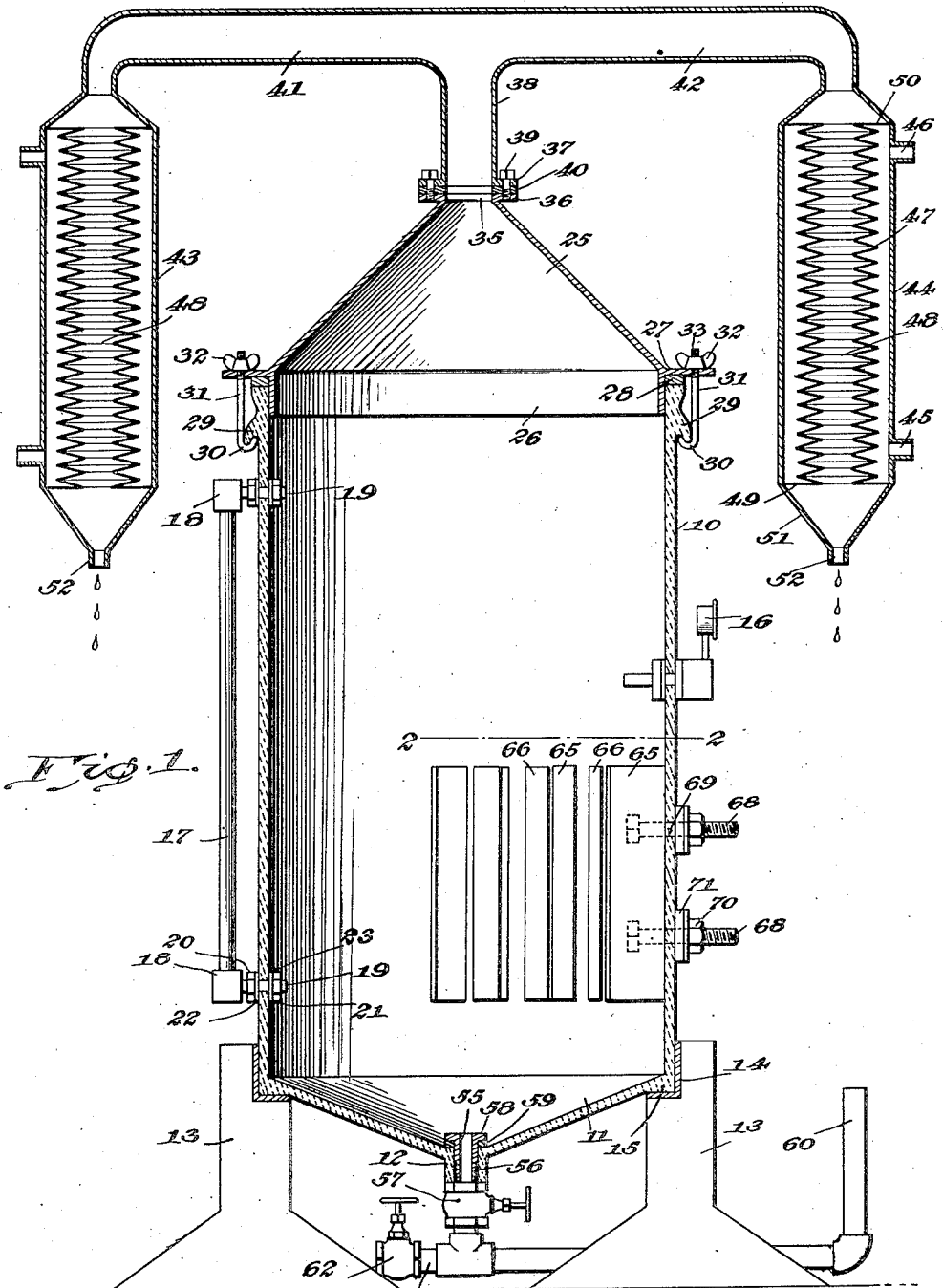

Aug. 27, 1935.  A. M. WERNER  2,012,365

APPARATUS FOR PURIFYING ALCOHOLIC LIQUORS

Filed July 11, 1934  2 Sheets-Sheet 1

WITNESS

INVENTOR
A. M. Werner,
BY
ATTORNEYS

Aug. 27, 1935.  A. M. WERNER  2,012,365
APPARATUS FOR PURIFYING ALCOHOLIC LIQUORS
Filed July 11, 1934  2 Sheets-Sheet 2
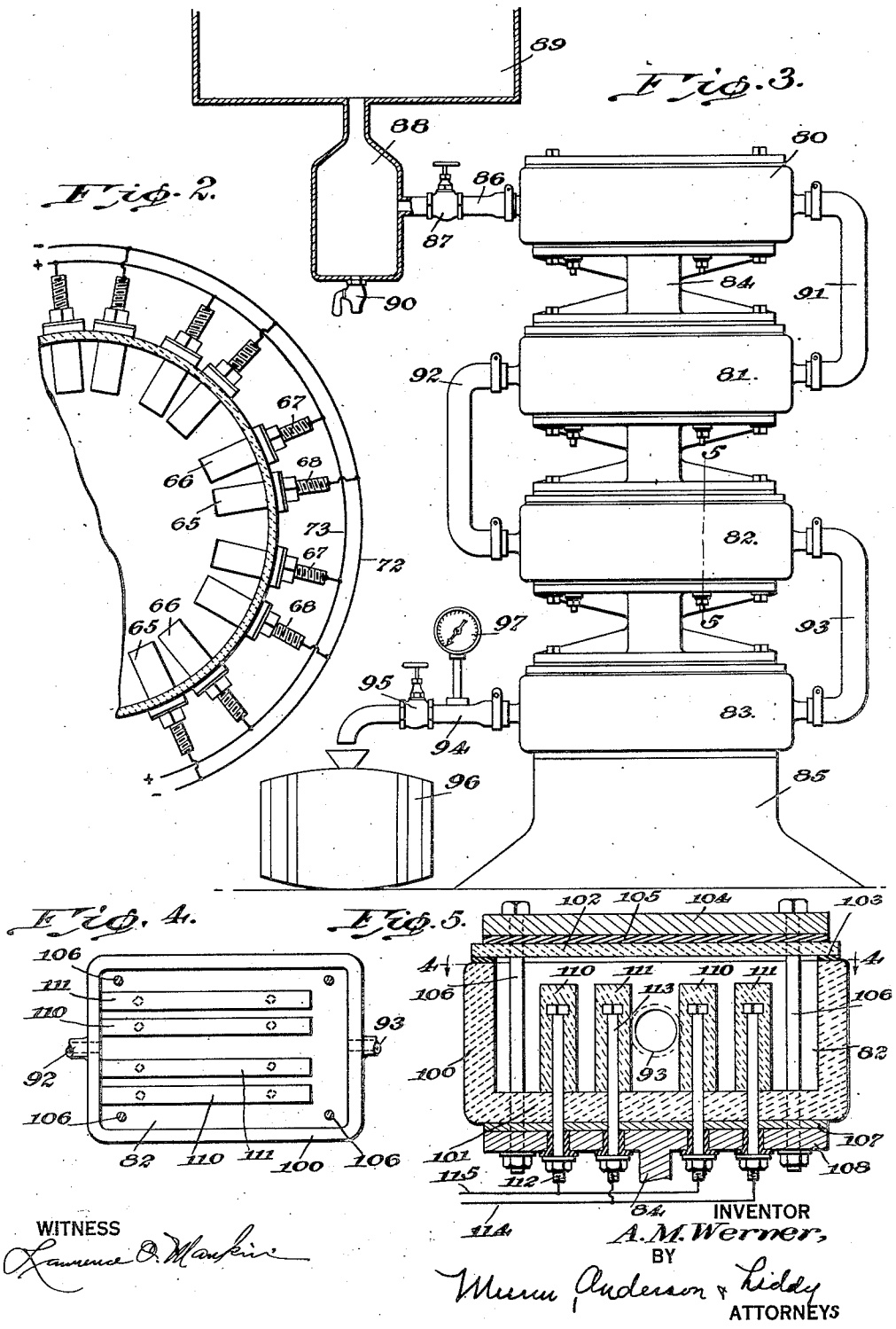

Patented Aug. 27, 1935

2,012,365

UNITED STATES PATENT OFFICE 2,012,365

APPARATUS FOR PURIFYING ALCOHOLIC LIQUORS

Arthur M. Werner, St. Louis, Mo.

Application July 11, 1934, Serial No. 734,661

7 Claims. (Cl. 204—26)

This invention relates to an apparatus for purifying alcoholic liquors.

An object of the invention is the provision of an apparatus for removing impurities from green liquors or for distilling and removing impurities from alcoholic mash.

An object of the invention is the provision of an apparatus for removing from green liquors or from alcoholic mash impurities which are deleterious to the human system such impurities including among other things fusel oil and acetone.

A further object of the invention is the provision of an apparatus having a closed container in which are mounted a plurality of spaced blocks formed of electrically conducting material, the liquid in the container being purified completing the circuit between the process, one terminal of an alternating circuit being connected with alternate blocks while the other terminal is connected with the remaining blocks, the current causing heating of the liquids in the container and causing a breaking down of the impurities and a separation of said impurities from the alcoholic liquors.

A still further object of the invention is the provision of an apparatus for removing impurities from green liquors and the liquors in alcoholic mash, the operation being carried out in closed containers and with the impurities being removed to such an extent that the green liquors may be placed in the usual type of ageing barrel and be converted into a palatable drink within a very short period of time.

A further object of the invention is the provision of an apparatus for removing impurities from alcoholic liquors, said apparatus including a plurality of spaced blocks formed principally of carbon and smaller quantities of minerals so that when an alternating current is passed through the liquors between the blocks which act as terminals for a circuit connected with a source of alternating current, the impurities will be eliminated.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a vertical section of one form of apparatus for distilling alcoholic mash and for removing the impurities therefrom, Figure 2 is a fragmentary horizontal section taken along the line 2—2 of Figure 1, Figure 3 is a view in elevation partly in section of a modified form of apparatus for removing impurities from green liquor, Figure 4 is a horizontal section taken along the line 4—4 of Figure 5, and Figure 5 is a vertical section taken along the line 5—5 of Figure 3.

Referring more particularly to Figures 1 and 3, it will be found that a container 10 is provided and formed of earthenware or porcelain, or of any similar non-conducting material.

A bottom 11 is formed of the same material and is conically shaped and terminates in a centrally disposed sleeve 12. The cylinder or container 10 is supported upon a base member 13 formed of concrete or stone and a cork gasket 14 is located between the base portions 15 of the container 10 and the base member 13.

The container is provided with a vapor pressure gauge 16 and a sight glass 17 connected at its ends by brackets 18 which are in communication with pipes 19 which open directly into the interior of the container 10. The sight glass as is well known can be inspected to determine the height of the liquid in the container. Nuts 20 and 21 are provided for securing the pipes in connection with washers 22 and 23 in sealed and supported relation on the container.

The top 25 is conically-shaped and is provided with a depending flange 26. The flange 26 fits neatly within the top of the container 10 while a flange 27 projects laterally from the lower end of the top and rests upon a cork gasket 28 carried by the top of the container 10.

The top is secured in position by means of an annular rib 29 formed on the outer wall of the container 10 adjacent the top. This rib is engaged by means of a hook 30 at the lower end of a bolt 31 and the upper end of the bolt passes through perforations in the annular lateral flange 27. The bolt is maintained in position by means of a wing nut 32 screwed upon the threaded end 33 of the bolt 31. By this construction the top is thoroughly sealed to the upper end of the container 10 and may be removed when desired.

The upper tapered end of the top 25 is provided with an opening 35 and a lateral flange 36. This flange is bolted to a second flange 37 on an outlet pipe 38 by means of bolts 39. A cork gasket 40 is located between the flanges 36 and 37 and seals the connection between the pipe 38 and the upper end of the cover or top 25.

The pipe 38 may be provided with laterally disposed branches 41 and 42. Each branch is connected with a condenser generally designated by the numeral 43. Each condenser consists of an outer casing 44 having an inlet pipe 45 and an outlet pipe 46 supplying cool water to a space 47 located between the casing 44 and a corrugated central member 48.

The outer and inner walls of the member 48 are corrugated to present as much as possible an extended surface area which is in contact with the cooling medium for condensing vapors from the container 10 that pass through the pipes 41 to the members 48. It will be noted that the bottom portion 49 of the member 48 and the top portion 50 are sealed to the lower and upper ends respectively of the casing 44.

The casing 44 is provided with a conical outlet portion 51 adapted to receive the condensed liquids which are discharged from a spout 52 and collected in any approved manner.

A hollow sleeve 55 is received by the member 12 on the bottom 11 of the container 10 and has its lower end, as shown at 56, threaded into a valve casing 57. The inner end of the sleeve is provided with a flange 58 which clamps a corked gasket 59 to the bottom of the container and seals the bottom against loss of fluid. A pipe 60 is supplied with liquid for filling the container 10 by means of a pipe 61. The last-mentioned pipe is controlled by means of a valve 62. A plurality of spaced plates or blocks 65 and 66 are arranged around the inner wall of the container 10 and adjacent the bottom. Several of the blocks or plates have imbedded therein the headed end of a threaded bolt 67 or 68. These bolts pass through perforations 69 in the side wall of the container and are held in place by means of a nut 70 and a cork washer 71. One of the bolts, such as 68, is connected to a block 65 while the other bolt 67 is connected to the block 66. Each of the bolts 68 is connected to one wire 72 of the circuit, while the other bolts 67 are connected to a wire 73. These two wires are connected to a source of alternating current and the liquid in the condenser 10 which covers the blocks or plates 65 and 66 completes the circuit between said blocks.

Each of the blocks are specially constructed and are formed principally of carbon and the ingredients composing the blocks are as follows:

| | Per cent |
|---|---|
| Bone carbon | 72 |
| Flake molybdenite | 18 |
| Ground wolframite | 7 |
| White oak charcoal | 3 |

The materials are reduced to a medium dust by pulverizing and then well mixed in a dry state after which they are mixed with a solution of 10% of pure glycerine and 90% pure grain alcohol to form a thick paste. This paste is then poured into a sectional mold consisting of two halves which are so constructed that when the paste is in the mold and the top half of the mold is put in place, a mechanical pressure may be exerted against the carbon paste as the top half of the mold is bolted down. The pressure developed during this operation would be approximately 200 lbs. although a pressure of 300 lbs. will not be detrimental.

The assembled mold containing the paste is then heated in an open oven at a temperature of 200° Fr. for two hours. During this time the alcohol in the paste is evaporated and the paste is set. The mold is then placed in a closed furnace and subjected to a heat of approximately 900° Fr. for two hours, after which the mold is taken from the furnace and allowed to cool in the air gradually. The plates are then removed from the mold and placed in a tray made of corundum. This tray contains plates or blocks and is then placed in a furnace and baked at a degree of 1300° for one hour. The whole is then removed from the furnace and permitted to cool gradually. The plates are then placed in an alcoholic bath and are left in the alcohol for approximately ten days. The alcohol employed should be pure grain alcohol of approximately 90%. After the expiration of this time the plates are removed from the alcohol and placed in an oven and subjected to a temperature of 200° for one hour, after which upon being cooled they are ready for use.

The operation of the device shown in Figs. 1 and 2 is as follows:

The container 10 is filled to the proper level with alcoholic mash and the level is determined by the sight glass 17. A switch (not shown) is closed and the current flows through wires 72 and 73. The circuit is completed by means of the plates 65 and 66.

The liquid is heated due to the fact that the liquid offers a resistance to the flow of alternating electric current and the heating is maintained so that vaporization takes place. Vapors rise to the top 25 and are carried off by the branches 41 and 42 to the respective condensers 43. Vapors at this point are condensed and discharged from the spouts 52 and cooled. Condensed liquids have been shown by chemical analysis that they are devoid of injurious impurities such as fusel oil, acetone, etc. A certain amount of water, however, is mixed in the distilled alcohol but the whiskey obtained from the condenser is approximately from 100 to 105 proof.

The alternating current flowing through the liquor breaks down or decomposes impurities mentioned above and are carried off principally as gas while the vapors are condensed. It has been found that distilled liquor thus produced is not only devoid of deleterious impurities but when this liquor is placed in the usual charred oak barrel it will have obtained a fine amber color in a very few days.

Referring more particularly to Figs. 3 to 5, inclusive, it will be found that a modified form of the construction is provided and in this case a series of smaller containers 80, 81, 82 and 83 are connected together by means of the members 84 with one of the series resting upon a base member 85 formed of concrete or stone. Any well known type of material may be employed for the base member. The top container 80 of the series is connected by means of a valve 87 and trap 88 to a tank 86 which is adapted to be supplied with green liquor from a still. The trap is provided with an outlet 90 at the lower end to permit the discharge of foreign matter conducted therethrough.

The containers 80 and 81 are connected by means of a pipe 91. The containers 80 and 81 are connected by means of a pipe 92 while containers 82 and 83 are connected by means of a pipe 93. A discharge pipe 94 is connected with the container 83 and a valve 95 controls the discharge from the container 83. Liquor thus obtained is collected in a charred oak barrel 96.

A thermometer 97 is connected to the pipe 93 between the valve 95 and the container 83.

Each container consists of a hollow member with the walls 100 and bottom 101 formed of porcelain or stoneware of the well known type. The top 102 rests upon the upper end of the container and this end is sealed against leakage by means of a cork gasket 103. The top is also formed of the same material as the container.

Each of the connecting members 84 is provided with a base 104 and a cork gasket 105 is located between the base of the container and the top or cover 102. Bolts 106 pass through the base member 104, gasket 105, cover 102 and the base member 101 of each container and secure not only the top in position but connects the containers together.

It will be noted that a gasket 107 of flexible material, which may be cork, is located between the bottom 101 of each container and the upper portion 108 of the connecting members 84.

Located within each container are a plurality of plates or blocks 110 and 111 arranged in pairs and these blocks are of identical construction as that shown in Fig. 1. Alternate blocks have imbedded therein a bolt 112 while the other blocks have imbedded therein bolts 113. The bolts 113 are connected with the wire 114 while bolts 112 are connected with the wire 115. This wire is controlled by a switch in the usual manner and connected with a source of alternating current. In this case the terminals of the circuit are connected with alternate blocks or plates and the liquid within the containers completes the circuit.

The operation of the device shown in Figs. 3 to 5, inclusive, is as follows: The green liquor is fed from the tank 89 into the trap 88 and the valve 87 is opened wide. Liquor then fills the series of containers 80 to 83, inclusive, and the device is ready for operation.

The current is turned on and the valve 95 is opened a quarter turn. Passing the current through the liquor, as has been previously stated, removes the impurities and the pure liquor is collected in the barrel 96 which has a charred interior formed of white oak and the liquor thus obtained will get an amber color and obtain a fine flavor in a very short time.

The thermometer 87 is carefully watched so that the temperatures in the containers will not rise above the danger point.

It will be appreciated that the apparatus shown in Fig. 3 is for the purpose of removing impurities and that no distilling effect is necessary.

I claim:

1. An apparatus for removing impurities from green liquors and liquors of mash comprising a closed container, a plurality of spaced electrical conducting blocks mounted in the container, an electric circuit, one terminal of the circuit being connected to alternate blocks, the other terminal of the circuit being connected to the other blocks, the liquor in the container completing the circuit between pairs of blocks, each of the blocks being formed principally of carbon and a small quantity of molybdenite.

2. An apparatus for removing impurities from green liquors and liquors of mash comprising a closed container, a plurality of spaced electrical conducting blocks mounted in the container, an electric circuit, one terminal of the circuit being connected to alternate blocks, the other terminal of the circuit being connected to the other blocks, the liquor in the container completing the circuit between pairs of blocks each of the blocks being formed principally of carbon containing molybdenite and wolframite.

3. An apparatus for removing impurities from green liquors and liquors of mash comprising a closed container, a plurality of spaced electrical conducting blocks mounted in the container, an electric circuit, one terminal of the circuit being connected to alternate blocks, the other terminal of the circuit being connected to the other blocks, the liquor in the container completing the circuit between pairs of the blocks, each of the blocks consisting of baked plates of bone carbon, molybdenite, wolframite and white oak charcoal.

4. An apparatus for removing impurities from green liquors and liquors of mash comprising a closed container, a plurality of spaced electrical conducting blocks mounted in the container, an electric circuit, one terminal of the circuit being connected to alternate blocks, the other terminal of the circuit being connected to the other blocks, the liquor in the container completing the circuit between pairs of blocks, each block consisting of approximately 72% of bone carbon, 18% flake molybdenite, 7% of ground wolframite and 3% of white oak charcoal.

5. An apparatus for removing impurities from green liquors and liquors of mash comprising a closed container, a plurality of spaced electrical conducting blocks mounted in the container, an electric circuit, one terminal of the circuit being connected to alternate blocks, the other terminal of the circuit being connected to the other blocks, the liquor in the container completing the circuit between pairs of blocks, each block consisting of baked plates containing approximately 72% of bone carbon, 18% flake molybdenite, 7% of wolframite and 3% of white oak charcoal.

6. An apparatus for removing impurities from alcoholic liquors comprising a closed container adapted to be partly filled with alcoholic liquor, a pair of blocks in the container, an electric circuit connected with a source of alternating current, one terminal of the circuit being connected to one block, the other terminal connected to the other block, the liquor completing the circuit between the blocks, each block being formed principally of carbon with smaller quantities of wolframite and molybdenite.

7. In an apparatus for removing impurities from alcoholic liquors, a container adapted to receive the liquors, a pair of spaced blocks in the container, one block forming the terminal of an alternating current circuit, the other block forming the other terminal, each block being formed principally of carbon, the remaining ingredients consisting of molybdenite and wolframite.

ARTHUR M. WERNER.